June 21, 1960   J. NEUMANN ET AL   2,942,177
METHOD AND MEANS FOR MEASURING MAGNETIC FIELD STRENGTH
Filed May 1, 1956                                   2 Sheets-Sheet 1

United States Patent Office 2,942,177
Patented June 21, 1960

2,942,177

METHOD AND MEANS FOR MEASURING MAGNETIC FIELD STRENGTH

Johannes Neumann, Erlangen, Herbert Weiss, Nurnberg, and Fritz Assmus, Hanau, Main, Germany, assignors to Siemens-Schuckertwerke Aktiengesellschaft, Berlin-Siemensstadt, Germany, a corporation of Germany Filed May 1, 1956, Ser. No. 581,870

Claims priority, application Germany May 6, 1955

26 Claims. (Cl. 324—37)

Our invention relates to the measuring of magnetic properties at the boundary faces or surfaces of magnetic bodies and has for its main objects to provide methods and means which are capable of measuring extremely fine or localized inhomogeneities and which, aside from measuring gradients of magnetic field strength, also permit locally determining the tangential component of field strength along the boundary face or surface of a magnetic body.

As regards such measurements, the new available measuring devices leave much to be desired. They are inaccurate in cases where the properties of the specimen are not uniform over the area of the specimen. Thus, a magnetic potential measuring device operating with a coiled loop connected to a ballistic galvanometer is necessarily so long as to make a response to local inhomogeneities impossible. For such reasons, the measuring of magnetic field strength and potential at the surface of thin sheets magnetized perpendicular to their largest surface, particularly the tangential field-strength component along such surface, has remained a difficult problem and has so far been wholly unsolved with respect to magnetic materials of extremely high coercive force, such as oxide magnets or magnets of manganese-bismuth, platinum-cobalt, or platinum-iron.

It is therefore a more specific object of our invention to overcome the just-metnioned difficulties and to permit a locally confined measurement of magnetic properties, including the tangential field component along the surface of the specimen, with a heretofore unattained accuracy, or on specimen materials of high coercive force heretofore not amenable in practice to such measurements.

Another object of our invention, applicable to any type of magnetic material including magnetic steel sheets, soft-iron rods or permanent magnets, is to afford magnetic surface measurements of such sensitivity as to permit determining or recording extremely slight magnitudes of local differences in the specimen material, or of its magnetization, or of local field inhomogeneities, and to scan or chart such local magnetic data over an entire surface of a magnetic specimen.

To achieve these objects, and according to a feature of our invention, we magnetize the magnetic, preferably ferromagnetic, body and place close or against its surface a flat semiconductor member or wafer whose thickness is much smaller, preferably of a smaller order of magnitude, than the dimension of the magnetic body taken in the direction of the magnetic flux within the body; we further orient the semiconductor member with its plane transverse to that flux direction; we pass an electric current through the member in a direction parallel to the surface of the magnetic body; and we measure across the member an electric parameter change as indicative of the local magnetic property to be determined.

The device used according to the invention may be equipped with only one semiconductor member or with a plurality of coacting members. The device is preferably designed for measuring the tangential component of the unidirectional or alternating magnetic field strength at the surface of magnetic bodies, or for measuring the normal component of the unidirectional or alternating induction or magnetization intensity at the boundary faces of magnetic bodies.

The electric parameter change in the semiconductor body indicative of the magnetic property to be determined, is either the variation in ohmic resistance which the current-traversed semiconductor member exhibits under the influence of the magnetic field; or instead of the resistance change, or additionally thereto, the Hall voltage is measured which occurs across the semiconductor body under the conjoint effects of electric current and magentic field.

Due to the fact that the practically obtainable values of magnetic field strength are limited to magnitudes in the neighborhood of 20,000 gauss by the saturation effect of ferromagnetic materials, the substance of the semiconductor member used for the purposes of the invention must have a sufficiently high carrier mobility to make the desired electric parameter change exceed the noise level or to permit an appreciable output current to be drawn from the semiconductor member. For that reason, the semiconductor substance of the member must have a carrier mobility, that is an electron or hole velocity, higher than approximately 6,000 cm.$^2$/volt second. This also has the advantage that for a given geometric dimenisoning of the semiconductor member and for a given primary power supply to the semiconductor member and the same charge carrier concentration of the semiconductor member, the electric parameter change, namely the change in resistance or Hall voltage, becomes much larger than with the conventional semiconductor materials such as selenium and silicon. This results in a corresponding increase in measuring accuracy and sensitivity. In order to secure the desired high carrier mobility, the substance of the semi-conductor member used according to the invention consists of a semi-conducting compound. Particularly suitable are the semiconductors of the type $A_{III}B_V$.

These semiconductor substances are binary compounds of boron, aluminum, gallium or indium, all from the third group of the periodic system, with nitrogen, phosphorus, arsenic or antimomy from the fifth group of the periodic system. Particularly advantageous for the present invention are indium antimonide (InSb) and indium arsenide (InAs) which have a carrier mobility above 20,000 cm.$^2$/volt second. Indium arsenide is also of particular advantage because it has a very small temperature coefficient of resistance as compared with germanium, heretofore predominantly used in semiconductor devices. The compounds can be manufactured by melting the two components together in stoichiometric proportions and then purifying the resulting crystalline compound by zone melting. The properties and manufacture of these $A_{III}B_V$ compounds are more fully described in the copending application Serial No. 275,785, filed March 10, 1952, by H. Welker for Semiconductor Devices and Methods of Their Manufacture, assigned to the assignee of the present application.

A further advantage obtained by the application of semiconductor substance having a carrier mobility above 6,000 cm.$^2$/volt second, particularly of the above-mentioned $A_{III}B_V$ compounds, resides in the fact that when the Hall voltage is taken as an indication of the magnetic property to be responded to, this Hall voltage can be directly applied to a load requiring a current magnitude above that needed for actuation of a galvanometer. In other words, the Hall voltage from such a semiconductor member can be directly connected to a power consuming device without the necessity of interposing a pre-amplifier with a high-ohmic input circuit. This cannot be done with a semiconductor device of germanium because the Hall voltage of a germanium body would break down when applied to such a load.

The practical significance of the lower limit of the carrier mobility is further explained as follows:

For any given condition of magnetic field strength, power supply in the primary electric circuit of the semiconductor, geometric dimensions and charge-carrier concentration, the Hall voltage generated in the semiconductor increases with the carrier mobility of the substance used for the semiconductor. Hence, if the Hall voltage to be generated is to have a practically useful order of magnitude with magnetic field strengths within the practically realizable limits, the carrier mobility must have a correspondingly high value.

For that reason, the invention requires the use of semiconductor substances with a carrier mobility of at least about 6,000 cm.$^2$/volt second.

"Carrier mobility" is defined as the velocity of the electric charge carriers within the semiconductive substance in centimeters per second in an electric field of one volt per centimeter. One and the same semiconductor substance may exhibit (n-type) conductance by excess electrons or negative carriers, or (p-type) conductance by defect-electrons (holes) or positive carriers, depending upon the preparative treatment applied to the substance. The type of conductance depends particularly on the choice of small traces of substitutional impurities that are added to, or contained in, the substance and cause lattice defects, i.e. disturb the perfection of the valence-bond structure. The term "carrier mobility" or "mobility" as used herein is generic to both types of conductance, it being only essential that either the electron mobility or the hole mobility of the semiconductive compound be about 6,000 cm.$^2$/volt second or more. The reason why such a minimum of carrier mobility is required will be understood from the following.

When, in a semiconductor, an electron carrying an electric charge $e$ and having a carrier mobility $\mu$ is subjected to an electric field $E$ as produced by the flow of current through the semiconductor, then the electron is subjected to the force $K_{el}=eE$. Under the effect of this force, the electron moves at a velocity $v=\mu E$. If this electron is also subjected to a magnetic field $H$ directed perpendicularly to the electric field, then an additional force is imposed upon the electron perpendicularly to its original direction of motion. This additional force has the magnitude $$K_{magn}=evH=e\mu EH$$

The ratio of the two forces $K_{magn}/K_{el}$ becomes equal to $\mu H$.

If $$K_{magn}/K_{el}=\mu H \ll 1$$

that is, as long as the value $\mu H$ is of a smaller order of magnitude than unity, the magnetic effect upon the electric properties of the semi-conductor is slight and negligible. On the other hand, this effect is considerable if $$K_{magn}/K_{el}=\mu H \approx 1$$

that is, when the magnetic force is of the same order of magnitude as the electric force so that the value $\mu H$ is approximately equal to unity.

Consequently, the value $\mu H=1$ represents a critical limit for the occurrence of appreciable magnetic effects. The magnetic field in the foregoing consideration is measured in volt second/cm.$^2$ and the mobility in cm.$^2$/volt second.

The elementary semiconductor substances heretofore used for transistors, namely silicon and germanium, do not have such a high carrier mobility, the best obtainable mobility, namely that of germanium, being about 3000 cm.$^2$/volt second. However, the required high carrier mobilities are available with semiconductive compounds.

A compound, in contrast to a homopolar element, has, aside from its homopolar component, also a heteropolar component due to the chemical difference in the lattice elements (in alkali halogenide crystals the homopolar component is even practically zero and only the ionized heteropolar component is present). The superposition of homopolar and heteropolar components results in an increase in bonding energy due to the so-called resonance strengthening. This has a favorable effect upon the carrier mobility in all those cases in which the heteropolar component of a compound is so weak that its detrimental influence upon the electron mobility is not yet noticeable while at the same time the strengthening of the bond by the resonance between the homopolar and heteropolar components is appreciable.

Returning to the explanation of the significance of the minimum values of the mobilities, we note that the magnetic field strengths readily obtainable with electromagnets are up to about 17,000 gauss while, because of the saturation properties of iron, field strengths larger than 17,000 gauss can be produced only with difficulty or at an unproportionately large expenditure. It follows that for securing magnetic effects of utilizable magnitude, the semi-conductor must have a minimum mobility of about 6,000 cm.$^2$/volt second, because 17,000 gauss is equal to $1.7 \cdot 10^{-4}$ volt second/cm.$^2$, so that $$\mu H = 6{,}000 \times 1.7 \times 10^{-4} \approx 1$$

The maximum field strength obtainable with the available permanent magnets is approximately 10,000 gauss. It follows, that, when providing a device according to the invention with a permanent-magnet field, a minimum carrier mobility of about 10,000 cm.$^2$/volt second is required, because 10,000 gauss is equal to $10^{-4}$ volt second/cm.$^2$ so that $$\mu H = 10{,}000 \times 10^{-4} = 1$$

It will be recognized that in view of the technically applicable magnetic field strengths, a minimum carrier mobility of about 6,000 or preferably 10,000 cm.$^2$/volt second is needed.

A carrier mobility of at least 20,000 cm.$^2$/volt second is of advantage for such technological applications in which proportionality must be maintained between the magnetic field and the magnitude of the electric current which excites this magnetic field. Such applications permit the use of magnetic fields only up to 5,000 gauss. This problem occurs, for instance, in transformers that require operating on the linear portion of a magnetic characteristic. It should further be considered that the saturation values of many Ni-Fe compounds and ferrites are located at 5,000 gauss and below. In such cases there is the requirement for a minimum carrier mobility of 20,000 cm.$^2$/volt second; because 5,000 gauss are equal to $0.5 \cdot 10^{-4}$ volt second/cm.$^2$, and it follows that $$\mu \cdot H = 20{,}000 \cdot 0.5 \cdot 10^{-4} = 1$$

The foregoing and other objects, advantages and features of the invention will be apparent from the embodiments described in the following with reference to the drawings in which:

Fig. 1 shows a part-sectional view,

Fig. 2 the electric circuit devices, and

Fig. 3 a perspective view of a semiconductor member for a device according to the invention relating to the measuring of the tangential component of the magnetic field strength at the surface of a magnetic body.

Fig. 4 illustrates the electric circuit diagram of a modification relating to a device otherwise similar to that shown in Fig. 1 and applicable for the same purpose.

Figs. 5 and 6 respectively show electric circuit diagrams of modified devices of increased sensitivity otherwise similar to the device according to Figs. 1 to 3.

Figure 1:
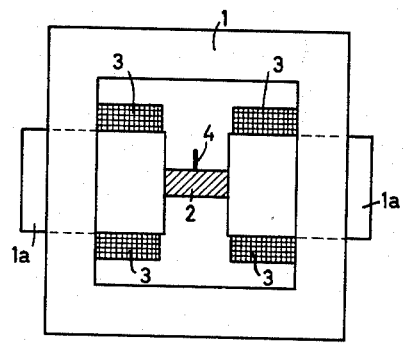

The device illustrated in Fig. 1 is provided with a magnetizing double yoke 1 with two adjustable pole pieces 1a. The magnetic body 2 to be tested is clamped between the two pole pieces. The excitation windings 3 of the yoke structure are mounted on the pole pieces. The flat and elongated semiconductor member is only schematically shown in Fig. 1 but is separately illustrated in Fig. 3. The semiconductor member, consisting preferably of indium arsenide or indium antimonide, is provided with two terminals 11 and 12 for the supply of electric current, and with two Hall electrodes 13 and 14. For measuring the tangential component of the magnetic field strength at different localities along the surface of the magentic body 2, the semiconductor member is placed edgewise with one of its longitudinal sides against the body surface. It is so oriented that the Hall-electrode axis, that is an imaginary connecting line betwene the two Hall electrodes 13 and 14, and the current axis which is the imaginary connecting line between electrodes 11 and 12, define together a plane perpendicular to the magnetic flux direction in body 2, this flux direction being indicated in Fig. 2 by arrows 15. The plane of the semiconductor wafer is then located perpendicular to the tangential component of the magnetic field strength to be measured. This plane is shown purposely much larger than it actually is, likewise the thickness of the semiconductor member in Fig. 3 is purposely shown exaggerated for better illustration. The dimension of the member in this direction is actually kept so small that it is of a smaller order of magnitude than the dimension of the magnetic body in the direction of the arrows 15. For example, the thickness of the member in the direction of arrows 15 in Fig. 2 and also the width of the member across the Hall electrodes may be one tenth, or a few tenths, of one millimeter. The length between terminals 11 and 12 is dependent upon the size of the specimen surface or the size of the pole faces and may amount to a few millimeters or be in the order of one centimeter. As a result of the small width, the influence of the potential difference of the magnetic field (field gradient) in this direction is negligibly slight.

It is preferable to place the semiconductor member into close contact engagement with the magnetic body 2. For this purpose it is usually necessary to coat at least part of the semiconductor surface with insulation. According to Fig. 3 it is further preferable to somewhat imbed one or both Hall electrodes 13, 14 into the material so that the member can be placed edgewise against the surface of the body 2.

Figure 2:
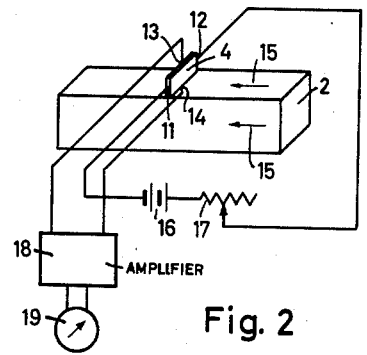
Figure 3:
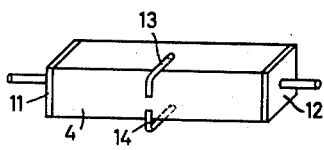

According to Fig. 2 the semiconductor member 4 has its terminals 11 and 12 connected to a source 16 of constant voltage through a calibrating rheostat 17. Under the conjoint effect of the electric current flowing through the semiconductor member 4 and the magnetic field of the body 2, a Hall voltage is generated between electrodes 13 and 14. This voltage depends upon the local tangential component of the magnetic field at the body surface. Consequently, the Hall voltage varies when the semiconductor member is displaced onto a locality at which the material of body 2 or its magnetization differs from the corresponding properties to which the semiconductor member was previously subjected. The variations in Hall voltage are measured through an amplifier 18 by an instrument 19. It will be understood, however, that, as explained above, the Hall electrodes may be directly connected to a current-consuming load for measuring or control purposes. For that reason, for instance, the amplifier shown in Fig. 2 may consist of a current amplifier such as magnetic amplifier and the device 19 may represent an apparatus to be controlled by the output of the current amplifier.

Devices of this type are applicable with magnetic unidirectional fields as well as alternating fields. Instead of utilizing the Hall effect, or in addition thereto, the device according to the present invention may also operate to measure or respond to the change in ohmic resistance to which the semiconductor is subjected when traversed by current and exposed to a magnetic field. This is exemplified by the circuit diagram shown in Fig. 4, the device being otherwise in accordance with Fig. 1.

Figure 4:
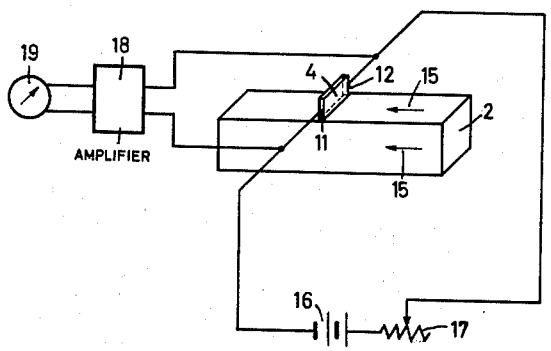

According to Fig. 4 the semiconductor member 4 is provided only with current terminals 11 and 12 but not with Hall electrodes. When in operation, substantially as described above with reference to Figs. 1 to 3, the ohmic resistance of member 4 across terminals 11 and 12 varies in dependence upon textural or other magnetic variations from point to point along the surface of the magnetic body 2 being tested. Consequently, the voltage drop across terminals 11 and 12, caused by a current supplied from source 16 through rheostat 17, also changes. These changes in voltage drop are applied through amplifier 18 to instrument 19 and are indicative of the magnetic property to be measured, in this case the tangential component of the magnetic field along the surface of body 2.

Particularly notable among the advantages of the device according to the invention is the above-mentioned fact that the sensing member has an extremely small dimension in the direction of the magnetic field. In this respect the device is remarkably distinct and superior to the devices heretofore known for measuring the tangential component of a magnetic field, for instance Rogowski's magnetic voltage meter. The dimension of these known devices in the just-mentioned direction is larger by 1 to 2 powers of 10 so that they are unsuitable for measuring of field properties that are extremely limited as to their locality of occurrence. This advantage of devices according to the invention affords in a simple manner the measuring of the magnetic field strength at the surface of thin sheets that are magnetized perpendicularly to their largest surface, for instance of materials of extremely high coercive force such as the above-mentioned oxide magnets and platinum alloys. Thus, one of the most troublesome problems of the magnetic measuring technique is for the first time solved by virtue of the invention. However, relative to the types of magnetic material which can be tested by means of the invention, there exists no limitation as to the applicability of the device. For instance, the device is also suitable for surface measurements of magnetic properties on dynamo sheets, soft-iron material and various other types of permanent magnets.

When utilizing the Hall effect as described above with reference to Fig. 2, the measuring accuracy can be improved, if desired, by compensating the circuit of the Hall electrodes to zero as regards ohmic and inductive impedance. For this purpose, a compensating circuit with a separate source of voltage is connected across the Hall electrodes, the voltage from the source of the compensating circuit is adjusted so that it just balances the Hall voltage, the condition of balance being indicated by an instrument. The amount of adjustment then needed for zero compensation is taken as a measure of the Hall voltage and hence of the magnetic property to be determined. This method, in principle, is in accordance with well known zero compensating methods and for that reason not illustrated.

The sensitivity of a device according to the invention can be increased by applying the principles and features disclosed in the copending application of H. Weiss, Serial No. 468,099, filed November 10, 1954, for Electric Semiconductor Devices, assigned to the assignee of the present invention. In accordance with the disclosure of the copending application as applied to devices according to the present invention, two semiconductor members as described above are used simultaneously. The two semiconductor members have their primary current supply circuit connected in parallel or series relation to a common source of current, whereas the two Hall circuits are connected in series opposition to each other. Embodiments of this kind are shown in Figs. 5 and 6.

Figure 5:
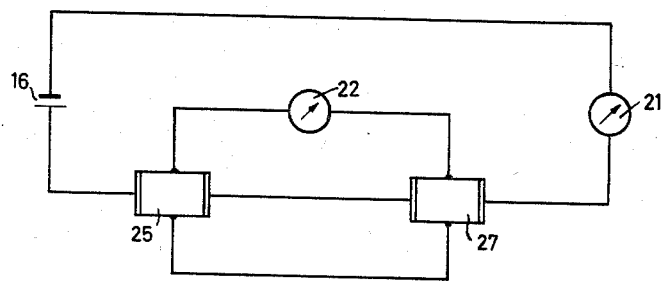

According to Fig. 5 the two Hall members 25 and 27 are connected in series with a common source 16 of current through a measuring instrument 21. The two pairs of Hall electrodes are connected with an instrument 22 in series opposition to each other. According to Fig. 6 the two semiconductor members 34 and 35 are energized in parallel relation to each other from the same current source 16 through an instrument 21. The resistances of the two members are equal so that both are traversed by the same amount of current. The two pairs of Hall electrodes are connected in series opposition to the instrument 22. The connecting leads between the two members are flexible to permit displacing one member relative to the other. In all other respects the device may be similar to that shown in Fig. 1.

Figure 6:
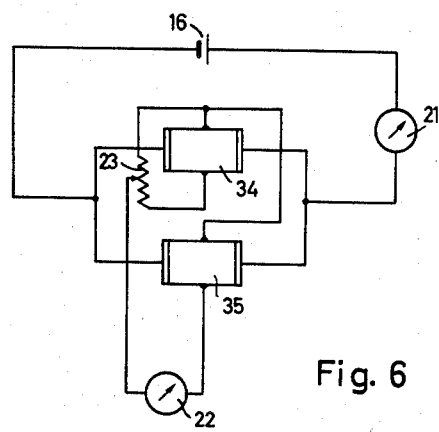

Referring to the embodiments of Figs. 5 and 6, the two semiconductor members are first placed onto a selected starting point of the magnetic body so that both respond to the same or substantially the same local magnetic conditions. Then the two Hall voltages generated by the two semiconductor members are supposed to be balanced against each other so that the indication of instrument 22 is zero. As a rule, it is necessary to compensate one of the voltages in order to obtain the desired balance. This may be done by connecting a calibrating rheostat into the Hall circuit as is exemplified at 23 in Fig. 6. After zero balance is established, one of the two semiconductor members is placed onto another spot of the magnetic body, and the resulting Hall voltage is then indicative of the departure of the magnetic field strength from the one obtaining at the starting point.

The above-mentioned expedients afford such a high sensitivity of the device that local differences in material and homogeneity of the magnetic field can be determined even if extremely slight differences are involved. If desired, such differences can be measured and, for instance, graphically recorded over the entire surface of a magnetic specimen or work piece. This is of advantage, for instance for the continuous supervision of manufacturing operations or for the purposes of magnetic fault analysis. In a similarly simple manner the devices permit determining and recording with the same high sensitivity such inhomogeneities of the field as may be caused by nonuniform magnetization of an inherently uniform magnetic material, as well as such slowly proceeding phenomena as magnetic after effects and magnetic aging.

Figure 7:
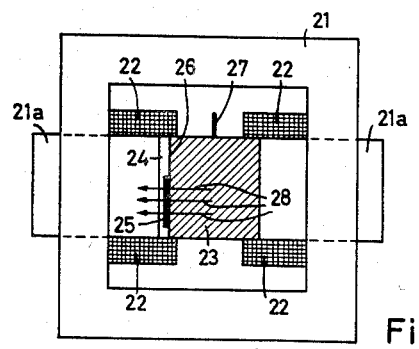
Fig. 7 illustrates a part-sectional view of a device according to the invention for measuring the normal component of the induction or magnetization intensity at the boundary surface of a magnetic body.

According to the embodiment of Fig. 7, a magnetizing double yoke 21 is provided with adjustable pole pieces 21a which carry the excitation windings 22. A magnetic body or specimen 23 is so mounted between the pole pieces that there remains between the body 23 and one of the pole pieces an air gap of constant width over the entire surface area of the magnetic body adjacent to the pole piece. The width of the air gap is kept as small as possible, for instance in the order of magnitude of 0.1 mm. Disposed in this narrow air gap is a semiconductor member 25 as described in the foregoing. The surface of the semiconductor member parallel to the axis of the two Hall electrodes and also parallel to the direction of the primary current passing through the semiconductor member between its current supply terminals is placed directly in face-to-face contact with the boundary surface 26 of the magnetic body 23. The induction lines traversing the semiconductor member are denoted by horizontal arrows 28. The supply leads for the primary current and for the Hall electrode of member 25 are not shown in Fig. 7, these leads, terminals and electrodes being in accordance with those shown in Fig. 2 for the semiconductor member 4.

The shape and position of the boundary surface 26 of the magnetic body is not limited to those shown in Fig. 7. That is, the semiconductor member may also be placed into face-to-face relation with any other boundary surface of the magnetic body, provided the adjacent pole piece of the magnetizing structure satisfies the above-mentioned requirements concerning the air gap. The length of the semiconductor member is preferably so chosen that it nowhere projects beyond the boundary surface of the magnetic body at which the measurements are to be made.

The air gap 24 may also be located between two similar magnetic bodies, preferably of the same size; or an air gap with a semiconductor member may be disposed on each of the two sides of a magnetic body. In the latter case it is preferable to connect the respective pairs of Hall electrodes of the two semiconductor members in series with each other.

Devices according to Fig. 7, as described above, measure the normal component of field strength or the magnetic induction of the specimen. However, aside from the induction, the magnetizing intensity (J) can also be measured conveniently if another semiconductor member 27 is provided for measuring the magnetic field strength $(H \cdot \mu_0)$ as described with respect to the semiconductor member 4 in the device of Figs. 1 to 3. The semiconductor 27 for measuring the magnetic field strength and the semiconductor member 25 for measuring the induction (B) are to be electrically interconnected so that the respective pairs of Hall electrodes are series opposed to each other in the measuring circuit similar to the connections shown in Figs. 5 and 6. The resulting Hall voltage then represents the magnetizing intensity $$J = B - H \cdot \mu_0$$

in this manner, saturation effects can also be measured.

Relative to the general applicability of the device and its advantages, the description given with reference to the embodiment of Figs. 1 to 5 also applies to the embodiment of Fig. 7.

Figure 8:
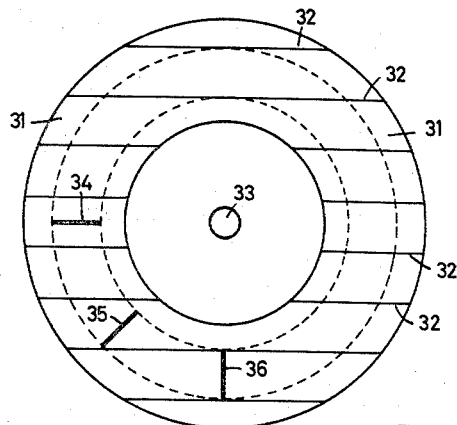
Fig. 8 illustrates schematically an example of applying the device and method according to the invention for determining the texture of a magnetic metal sheet.

Fig. 8 relates to a method of measuring, by means of a device according to the invention, the anisotropy or texture of a magnetic material. Denoted by 31 is a ring-shaped sheet of magnetic material. The preferred magnetic orientation is indicated by lines 32. The magnetic excitation of the sheet can be effected in known manner, for instance by one or several centrally located current conductors which traverse the plane of illustration at 33. Represented at 34, 35 and 36 are three semiconductor members in different radial directions. The surface of the semiconductor wafers, which is determined by the spacing direction of the Hall electrodes and by the direction of the primary current, is perpendicular to the sheet surface and, in each instance, points toward the center of the sheet, all three members having the same distance from the center. For testing the texture of the material, those spots are located by means of the device at which the Hall voltage and/or the magnetic change in resistance of the semiconductor member is a minimum or a maximum. In this manner, the magnetic orientation and thereby the texture of the sheet is determined. By continuously rotating the ring-shaped specimen relative to stationary semiconductor members, the values of field strength can be determined for all angular positions relative to the preferred orientation and, if desired, can be continuously recorded.

It will be understood by those skilled in the art, upon a study of this disclosure, that our invention permits of various modifications and can be embodied in devices other than those specifically shown and described, without departing from the essence of the invention and within the scope of the claims annexed hereto.

We claim:

1. The method of sensing a magnetic surface property of a magnetic body, which comprises placing a semiconductor wafer member, of a carrier mobility above 6000 cm.²/volt second, edgewise against the surface of the magnetized body and orienting the member with its wafer plane substantially perpendicular to said surface and perpendicular to the magnetic flux direction in said body, passing an electric current through said member in a direction parallel to the body surface, and measuring an electric parameter change of said member, whereby said change is indicative of the tangential component of magnetic field strength along said surface, the semiconductor material of the member being a binary compound of an element taken from the group consisting of boron, aluminum, gallium, and indium, with an element of the group consisting of nitrogen, phosphorus, arsenic, and antimony.

2. The method of sensing a magnetic surface property of a magnetic body, which comprises placing a thin flat semiconductor member of more than 6,000 cm.²/volt second mobility against a surface of the magnetized body with the member oriented parallel and substantially in face-to-face contact with said surface so as to be traversed at a right angle by the magnetic flux lines issuing from said body, the semiconductor material of the member being a binary compound of an element taken from the group consisting of boron, aluminum, gallium, and indium, with an element of the group consisting of nitrogen, phosphorus, arsenic, and antimony, passing an electric current through said member in a direction parallel to the body surface, and measuring an electric parameter change of said member, whereby said change is indicative of the normal component of local magnetic field strength of said body.

3. The method of sensing a magnetic surface property of a magnetic body, which comprises placing a semiconductor wafer member of more than 6,000 cm.²/volt second mobility edgewise against the surface of the magnetized body and orienting the member with its wafer plane substantially perpendicular to said surface and perpendicular to the magnetic flux direction in said body, the semiconductor material of the member being a binary compound of an element taken from the group consisting of boron, aluminum, gallium, and indium, with an element of the group consisting of nitrogen, phosphorus, arsenic, and antimony, passing electric current through said member longitudinal to said surface and transverse to the magnetic flux path, and measuring the variation in Hall voltage across said member as indicative of the local tangential component of magnetic field strength along said body.

4. The method of measuring magnetic surface properties of a magnetic body which comprises placing close to the surface of the magnetized body a flat semiconductor member of a carrier mobility above 6,000 cm.²/volt second, the semiconductor material of the member being a binary compound of an element taken from the group consisting of boron, aluminum, gallium, and indium, with an element of the group consisting of nitrogen, phosphorus, arsenic, and antimony, said member having a thickness of a smaller order of magnitude than the dimension of said body in the direction of the magnetic flux path in said body, orienting the member relative to the body so that the plane of said member is perpendicular to said surface and transverse to said direction, passing electric current through said member in a direction parallel to said surface whereby a voltage drop is caused by said current to occur across said member, and measuring the variation of said voltage drop as indicative of the local magnetic property to be determined.

5. The method of sensing a magnetic surface property of a magnetic body, which comprises placing a thin semiconductor wafer member of more than 6,000 cm.²/volt second mobility edgewise against the surface of the magnetized body and orienting the member with its wafer plane substantially perpendicular to said surface and perpendicular to the magnetic flux direction in said body, the semiconductor material of the member being a binary compound of an element taken from the group consisting of boron, aluminum, gallium, and indium, with an element of the group consisting of nitrogen, phosphorus, arsenic, and antimony, said member having a thickness of smaller order of magnitude than the dimension of said body in said direction, and said member having perpendicular to said body surface a width of negligibly small size as regards the gradient of magnetic potential along said width, said width and said thickness being not more than a few tenths of a millimeter each, passing an electric current through said member in a direction parallel to said surface, and sensing an electric parameter change of said member.

6. The method of measuring local differences of a magnetic surface property of a magnetic specimen, which comprises placing two semiconductor Hall members of more than 6,000 cm.²/volt second mobility onto the specimen at respectively different planes, passing a primary electric current through both members longitudinally to each of said planes and transverse to the magnetic flux path through said planes, measuring the two Hall voltages of said respective members in series opposition, and displacing one of said members on said surface whereby the variation in resultant Hall voltage caused by the displacement is indicative of the magnetic difference to be determined.

7. The method of measuring local differences of a magnetic surface property of a magnetic specimen, which comprises placing two semiconductor Hall members of more than 6,000 cm.²/volt second mobility onto the specimen at respectively different surfaces, the semiconductor material of the members being a binary compound of an element taken from the group consisting of boron, aluminum, gallium, and indium, with an element of the group consisting of nitrogen, phosphorus, arsenic, and antimony, passing a primary electric current through both members parallel to each of said surfaces, and measuring the two Hall voltages in series opposed relation to each other, one of said Hall members being oriented edgewise against a specimen surface and with the plane of the Hall member perpendicular to said surface and perpendicular to the magnetic flux direction in the specimen whereby the Hall voltage of said one member varies in dependence upon the tangential component of field strength along the surface of the specimen, the second Hall member being oriented in face-to-face relation to the specimen at a specimen surface transverse to the direction of the magnetic flux in the specimen, whereby the resultant of said two Hall voltages is a measure of the magnetization intensity of the specimen.

8. Device for measuring magnetic surface properties of a magnetic specimen, comprising a magnetizing yoke structure having two pole pieces between which the specimen is mounted when the device is in operation, there being an air gap, of substantially constant width over the surface area of the specimen, adjacent to one pole piece, the width being about one tenth of a millimeter, a flat semiconductor member of a carrier mobility above 6,000 cm.²/volt second disposed in said gap adjacent to the specimen and oriented to have the plane of the member extend transverse to the spacing between said two pole pieces when in operation, the semiconductor material of the member being a binary compound of an element taken from the group consisting of boron, aluminum, gallium, and indium, with an element of the group consisting of nitrogen, phosphorus, arsenic, and antimony, said member having a thickness less than said gap, an electric circuit having a source of normally constant voltage connected with said member and having in said member a current flow direction perpendicular to said spacing and parallel to the adjacent surface of the specimen, and electric measuring means connected across said member for response to a magnetic property of the specimen at the locality of said member.

9. In a magnetic measuring device according to claim 8, said semiconductor member comprising two current supply terminals at opposite ends of the member respectively and two Hall electrodes disposed on respectively opposite sides between said terminals, said member being exteriorly insulated, at least one of said opposite sides having a continuous straight surface throughout, whereby said one of the sides carrying a Hall electrode can be placed in face-to-face contact with the specimen.

10. Device for measuring magnetic surface properties of a magnetic specimen, comprising a magnetizing yoke structure having two pole pieces between which the specimen is mounted when the device is in operation, there being an air gap, of substantially constant width over the surface area of the specimen, adjacent to one pole piece, the width being about one tenth of a millimeter, two thin flat semiconductor members of a carrier mobility above 20,000 cm.$^2$/volt second, the semiconductor material of the members being taken from the group consisting of indium arsenide and indium antimonide, each member being disposed adjacent to the specimen and oriented to have the plane of the member extend transverse to the spacing between said two pole pieces when in operation, each member having a thickness of a smaller order of magnitude than said spacing, one of the members being in said gap, an electric current having a source of normally constant voltage connected with said two members and having in each member a current flow direction perpendicular to said spacing and parallel to the adjacent surface of the specimen, each of said two members having a pair of Hall electrodes, and a measuring circuit interconnecting said two electrode pairs in series opposed relation to each other.

11. Device for measuring magnetic surface properties of a magnetic specimen, comprising two flat semiconductor members of a carrier mobility above 6,000 cm.$^2$/volt second, each member having a planar surface to be placed against the specimen and having dimensions of a smaller order of magnitude than the specimen to be tested, an electric primary circuit having a current source of constant voltage connected with both said members, each of said two members having a pair of Hall electrodes, a measuring circuit, said two pairs of Hall electrodes being connected in said measuring circuit in series opposed relation to each other, and said two circuits having flexible leads between said two members to permit changing the location of one member at the specimen relative to the other member.

12. The device of claim 8 in which the mobility is not less than about 20,000 cm.$^2$/volt second.

13. The method of sensing surface variations in ferromagnetic properties of a ferromagnetic body comprising magnetizing the ferromagnetic body and placing, at least closely adjacent thereto, a semiconductor wafer not more than a few tenths of a millimeter thick, said wafer having opposite Hall electrodes not more than a few tenths of a millimeter apart, passing an electric current lengthwise through the member in a direction parallel to the surface of the magnetic body, the Hall electrode axis being transverse to said electric current direction, the semiconductor material of the wafer having a carrier mobility above 20,000 cm.$^2$/volt second and being taken from the group consisting of indium antimonide and indium arsenide, and sensing changes in the Hall voltage across the Hall electrodes.

14. The method of claim 13 in which the thickness and width are about one tenth of a millimeter each.

15. Device for measuring magnetic surface properties of a magnetic specimen, characterized in that a varying Hall voltage is generated by variations in the said properties and the generated varying Hall voltage is measured by measuring circuit means having a low-ohmic input circuit, comprising a magnetizing yoke structure having two pole pieces between which the specimen is mounted when the device is in operation, there being an air gap, of substantially constant width over the surface area of the specimen, adjacent to one pole piece, the width being about one tenth of a millimeter, two thin flat semiconductor members of a carrier mobility above 20,000 cm.$^2$/volt second, the semiconductor material of the members being taken from the group consisting of indium arsenide and indium antimonide, each member being disposed adjacent to the specimen and oriented to have the plane of the member extend transverse to the spacing between said two pole pieces when in operation, each member having a thickness of a smaller order of magnitude than said spacing, one of the members being in said gap, an electric current having a source of normally constant voltage connected with said two members and having in each member a current flow direction perpendicular to said spacing and parallel to the adjacent surface of the specimen, each of said two members having a pair of Hall electrodes, said measuring circuit means interconnecting said two electrode pairs in series opposed relation to each other.

16. The method of sensing surface variations in ferromagnetic properties of a ferromagnetic body, characterized in that a varying Hall voltage is generated by said variations and the generated varying Hall voltage is sensed by means having a low-ohmic input circuit, said method comprising magnetizing the ferromagnetic body and placing, at least closely adjacent thereto, a semiconductor wafer not more than a few tenths of a millimeter thick, said wafer having opposite Hall electrodes not more than a few tenths of a millimeter apart, passing an electric current lengthwise through the member in a direction parallel to the surface of the magnetic body, the Hall electrode axis being transverse to said electric current direction, the semiconductor material of the wafer having a carrier mobility above 20,000 cm.$^2$/volt second and being taken from the group consisting of indium antimonide and indium arsenide, and sensing changes in the Hall voltage across the Hall electrodes.

17. Device for measuring magnetic surface properties of a magnetic specimen, characterized in that a varying Hall voltage is generated by variations in the said properties and the generated varying Hall voltage is measured by measuring circuit means having a low-ohmic input circuit, comprising a magnetizing yoke structure having two pole pieces between which the specimen is mounted when the device is in operation, there being an air gap, of substantially constant width over the surface area of the specimen, adjacent to one pole piece, two thin flat semiconductor members of a carrier mobility above 20,000 cm.$^2$/volt second, the semiconductor material of the members being taken from the group consisting of indium arsenide and indium antimonide, each member being disposed adjacent to the specimen and oriented to have the plane of the member extend transverse to the spacing between said two pole pieces when in operation, each member having a thickness of a smaller order of magnitude than said spacing, one of the members being in said gap, an electric current having a source of normally constant voltage connected with said two members and having in each member a current flow direction perpendicular to said spacing and parallel to the adjacent surface of the specimen, each of said two members having a pair of Hall electrodes, said measuring circuit means interconnecting said two electrode pairs in series opposed relation to each other.

18. Device for measuring magnetic surface properties of a magnetic specimen, comprising a magnetizing yoke structure having two pole pieces between which the specimen is mounted when the device is in operation, there being an air gap, of substantially constant width over the surface area of the specimen, adjacent to one pole piece, a flat semiconductor member of a carrier mobility above 6,000 cm.²/volt second disposed in said gap adjacent to the specimen and oriented to have the plane of the member extend transverse to the spacing between said two pole pieces when in operation, the semiconductor material of the member being a binary compound of an element taken from the group consisting of boron, aluminum, gallium, and indium, with an element of the group consisting of nitrogen, phosphorus, arsenic, and antimony, said member having a thickness less than said gap, an electric circuit having a source of normally constant voltage connected with said member and having in said member a current flow direction perpendicular to said spacing and parallel to the adjacent surface of the specimen, and electric measuring means connected across said member for response to a magnetic property of the specimen at the locality of said member.

19. Device for measuring magneitc surface properties of a magnetic specimen, comprising a magnetizing yoke structure having two pole pieces between which the specimen is mounted when the device is in operation, there being an air gap, of substantially constant width over the surface area of the specimen, adjacent to one pole piece, two thin flat semiconductor members of a carrier mobility above 20,000 cm.²/volt second, the semiconductor material of the members being taken from the group consisting of indium arsenide and indium antimonide, each member being disposed adjacent to the specimen and oriented to have the plane of the member extend transverse to the spacing between said two pole pieces when in operation, each member having a thickness of a smaller order of magnitude than said spacing, one of the members being in said gap, an electric current having a source of normally constant voltage connected with said two members and having in each member a current flow direction perpendicular to said spacing and parallel to the adjacent surface of the specimen, each of said two members having a pair of Hall electrodes, and a measuring circuit interconnecting said two electrode pairs in series opposed relation to each other.

20. The device defined in claim 11, the semiconductor material of the member being a binary compound of an element taken from the group consisting of boron, aluminum, gallium, and indium, with an element of the group consisting of nitrogen, phosphorus, arsenic, and antimony.

21. An apparatus for measuring the tangential magnetic field component at a surface of a magnetic specimen body, comprising a magnetizing structure having two pole pieces between which the body is mounted when in operation, a flat rectangular shaped semiconductor member having a carrier mobility above 6,000 cm.²/volt second, the member being composed of a compound of an element taken from the group consisting of boron, aluminum, gallium, and indium, with an element of the group consisting of nitrogen, phosphorus, arsenic, and antimony, the specimen body being so positioned that the flux lines pass through the body longitudinally of an exposed surface of the body, said member having a thickness of a smaller order of magnitude than the dimension of said body in the direction of magnetic flux in said body, the member being positioned when in operation with its flat large area faces perpendicular to the surface of the body being tested and perpendicular, crosswise, to the magnetic flux, the cross-wise length of the member being not greater than the cross-wise width of the said surface of the body, the member having an insulated edge surface placed in contact with the surface of the specimen body, said member having means for passing a current therethrough transversely of the flux and parallel to said surface, and electric measuring means connected to said member for response to a magnetic property of the specimen body.

22. The apparatus defined in claim 21, the compound being InAs having a carrier mobility not less than 20,000 cm.²/volt second.

23. The apparatus defined in claim 21, the compound being InSb having a carrier mobility not less than 20,000 cm.²/volt second.

24. An apparatus for measuring the tangential magnetic field component at a surface of a magnetic specimen body, comprising a magnetizing structure having two pole pieces between which the body is mounted when in operation, a flat rectangular shaped semiconductor member having a carrier mobility above 6000 cm.²/volt second, the member being composed of a compound of an element taken from the group consisting of boron, aluminum, gallium, and indium, with an element of the group consisting of nitrogen, phosphorus, arsenic, and antimony, the specimen body being so positioned that the flux lines pass through the body longitudinally of an exposed surface of the body, said member having a thickness of a smaller order of magnitude than the dimension of said body in the direction of magnetic flux in said body, the member being positioned when in operation with its flat large area faces perpendicular to the surface of the body being tested and perpendicular, cross-wise, to the magnetic flux, the cross-wise length of the member being not greater than the cross-wise width of the said surface of the body, the member having an insulated edge surface placed in contact with the surface of the specimen body, said member having means for passing a current therethrough transversely of the flux and parallel to said surface, said member having a Hall electrode, and electric measuring means connected to said Hall electrode for response to a magnetic property of the specimen body.

25. The apparatus of claim 24, the compound being InAs, having a carrier mobility of at least 20,000.

26. The apparatus of claim 24, the compound being InSb, having a carrier mobility of at least 20,000.

References Cited in the file of this patent

UNITED STATES PATENTS

| | | |
|---|---|---|
| 1,998,952 | Edgar et al. | Apr. 23, 1935 |
| 2,550,492 | Millar | Apr. 24, 1951 |
| 2,562,120 | Pearson | July 24, 1951 |
| 2,649,569 | Pearson | Aug. 18, 1953 |
| 2,707,769 | Shaper | May 3, 1955 |
| 2,736,822 | Dunlap | Feb. 28, 1956 |